Jan. 19, 1965 A. AMOUR 3,165,981
FLUID ACTUATED SERVO-CONTROL DEVICE
Filed Feb. 5, 1962 3 Sheets-Sheet 1

INVENTOR.
ALESSANDRO AMOUR
BY *Irwin S. Thompson*
ATTORNEY

INVENTOR.
ALESSANDRO AMOUR
BY Irvin S. Thompson
ATTORNEY

Jan. 19, 1965   A. AMOUR   3,165,981
FLUID ACTUATED SERVO-CONTROL DEVICE
Filed Feb. 5, 1962   3 Sheets-Sheet 3

INVENTOR.
ALESSANDRO AMOUR
BY Irvin S. Thompson
ATTORNEY 3,165,981
FLUID ACTUATED SERVO-CONTROL DEVICE
Alessandro Amour, 39 Via G. Casalis, Turin,
Piedmont, Italy
Filed Feb. 5, 1962, Ser. No. 171,156
Claims priority, application Italy, Feb. 13, 1961,
2,947/61; Aug. 2, 1961, 13,838/61
6 Claims. (Cl. 91—402)

In modern engineering practice there occur several instances in which a given operation must be accomplished with a speed variable in the course of said operation, according to a predetermined program. For instance, in engaging a clutch transmission device or the like, the engagement stroke must take place with high speed in the first portion, corresponding to approach the clutch members, then very slowly in the second portion, corresponding to the actual engagement of said members, and finally again at high speed in the third and last portion, corresponding to the application of the normal working pressure to the clutch members already engaged, as well as to the accomplishment of a short idle stroke of the drive members. Similar requirements may have to be fulfilled in the braking of moving parts and in many other instances. In still further cases, the drive portions to be accomplished at different speeds may be only two in number, or else they may be more than three. In all these instances, the use of servo-control devices involves difficult problems, which may be solved only by means of complex devices, adapted to carry out the program required for the operation concerned.

This invention relates to a pressure-fluid (pneumatic or preferably hydraulic) actuated servo-control device which is suited to fulfil the requirements as set forth above and nonetheless has a high constructional and operational simplicity which imparts thereto exceptional qualities of economy, long life and reliability of operation. This device is particularly useful for engagement control of the clutch of a motor vehicle, and will be described below with reference to this typical application; it is understood, however, that said device may be used for many other applications, either in vehicles, or in lifting apparatus, or in machine tools and generally in several and various fields of engineering.

The device in accordance with this invention is based on the principle of performing the operation required by means of a piston slidably mounted within a cylinder, whose feeding is controlled by a slide valve and whose walls are provided with ports which are covered by the piston during a portion of its stroke and whose connections with the pressure-fluid circuit are at least in part controlled by said slide valve, said ports producing the desired variation in the displacement speed of the piston when the latter covers or respectively ceases to cover them. The various programs which can be carried out depend on the position of said ports and on the dimensions of the device, so that the latter must vary in size and shape depending on the requirements of any particular application.

The following description refers to a nonlimiting embodiment, given by way of example, which is particularly suited to the typical application mentioned above, and is shown in the accompanying drawings, wherein.

Figure 1:
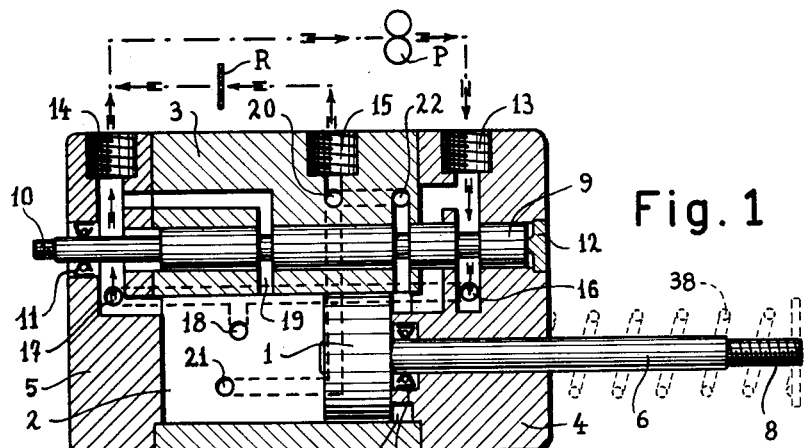
FIGS. 1 to 6 show the device according to the invention, in a simple form thereof, illustrated in a somewhat diagrammatical longitudinal section and in various positions of operation.

The device according to the invention comprises a piston 1 slidably mounted within a cylinder 2 bored in a body or casing 3 closed at both its ends by the heads 4 and 5. The piston 1 is connected with a piston rod 6 passing through the head 4 in a tight manner by means of an annular packing 7 and terminating with a portion 8, for instance screw-threaded, intended to be connected with the part to be actuated, e.g. the engagement lever of a clutch. In the body 3 and in the heads 4, 5, parallel to the cylinder 2, there is slidably mounted a cylindrical slide or distributing valve 9, whose end 10 passes through head 5 in a tight manner by virtue of an annular packing 11, and which is for instance screw-threaded for connection with a mechanical, electromagnetic or like drive member. The opposite end of the seat of slide valve 9 is closed by means of a plug 12.

The body and the heads of the device are formed with three connections, one for arrival of a pressure fluid, the other for discharge and the third for regulation, 13, 14 and 15 respectively. At the outside of the device, said arrival and discharge connections are connected with the outlet and the inlet of a pump P respectively, while the connection 15 is connected to discharge 14 through a flow regulator member R, consisting of a gauged diaphragm, or a tap with adjustable plunger, or the like.

The connection 13 can be put in communication (R.H. position of the slide valve) with a pipe 16 indicated with broken lines and opening at 17 in communication with connection 14, as well as at 18 in a port disposed in a predetermined position in the wall of cylinder 2. Said connection may instead be put in communication (L.H. position of the slide valve) with the R.H. chamber of cylinder 2.

Connection 14 is permanently in communication with the L. H. chamber of cylinder 2 and, through the opening 17 of pipe 16, with the port 18. Further, when the slide valve is displaced to the right, said connection will also be put in communication with a port 19 provided in the wall of cylinder 2, displaced on the right relative to port 18.

Connection 15 is in communication, through a duct 20 shown in broken lines, with a port 21 provided in the wall of cylinder 2, displaced on the left relative to port 18. Further, when the slide valve is displaced to the right, said connection will also be in communication with the R. H. chamber of cylinder 2, through a pipe 22.

When the device is at rest, it has the configuration shown in FIG. 1. The drive member of slide valve 9 will maintain the latter to the right: piston 1 is at the end of its stroke at the right and is held there by a return member, such as a spring, for the purpose of illustration diagrammatically shown at 38, but generally forming part of the member to be operated, as in particular in the case of a clutch; this, in the example, is now engaged and in conditions of normal operation. In this configuration, pump P delivers fluid under pressure to connection 13, whence—through pipe 16, 17—the fluid reaches the connection 14 and then flows back to pump P, without exerting any action. Communication of pipe 16 with connection 13 may be omitted in those instances when it is not necessary to maintain the circulation of fluid mentioned above, e.g. if the circuit of the device is branched off from the pressure lubrication circuit of the engine.

Figure 2:
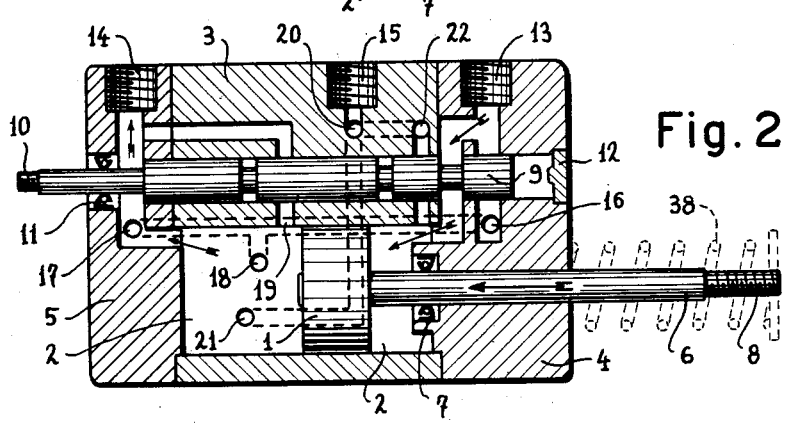
Figure 3:
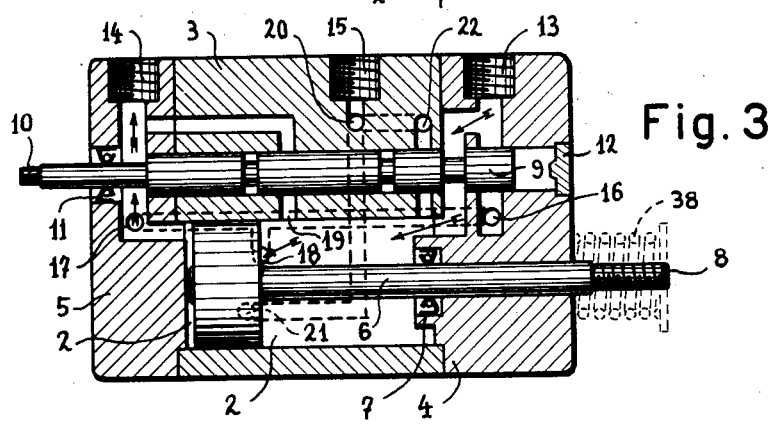
Figure 4:
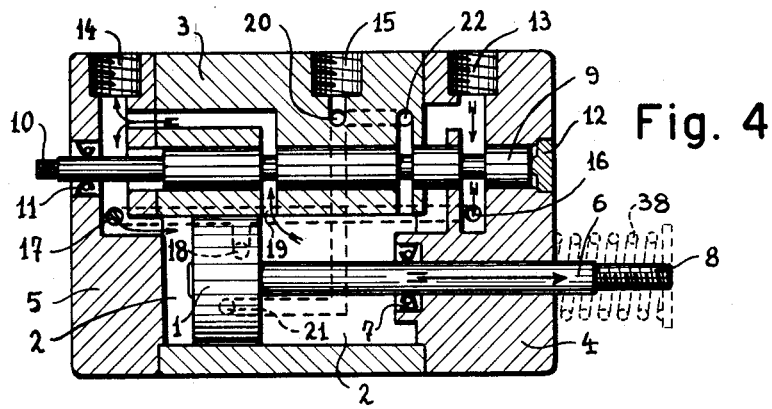
Figure 5:
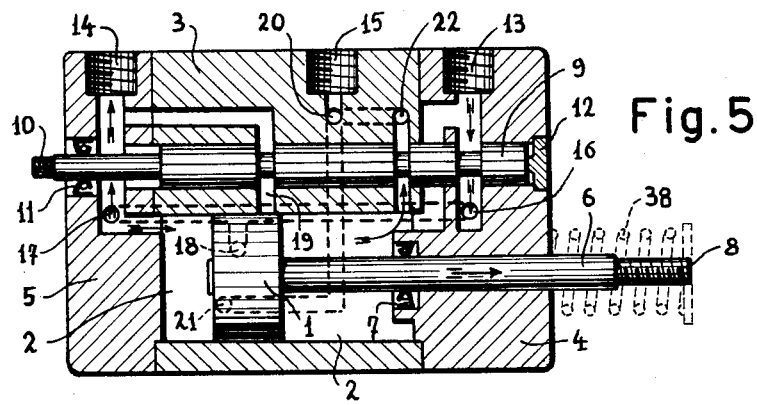
Figure 6:
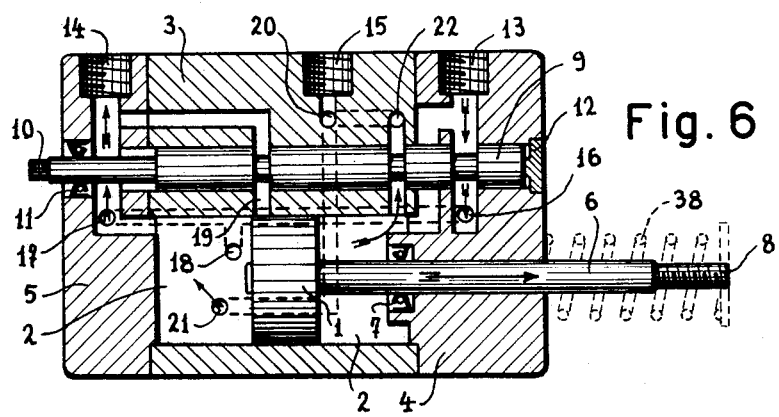

When the clutch must be disengaged, the drive member of the slide valve 9 (for instance an electromagnet) will displace said slide valve to the left, thereby putting the connection 13 in communication with the R. H. chamber of cylinder 2, so that the fluid under pressure will displace piston 1 (FIGURE 2) with its rod 6 and the driven member to the left, while the fluid escapes from the L. H. chamber of the cylinder directly through the connection 14. The piston is displaced to the left up to the end of its stroke, and in this position (FIGURE 3) it will expose port 18, thereby permitting the fluid—coming from connection 13—to reach the discharge connection 14 through opening 17. The device remains in this position (clutch disengaged) until the drive member of slide valve 9 will again displace the latter towards the right. Being then driven by its return member, due to lack of fluid pressure in the R. H. chamber of cylinder 2, the piston 1 will be displaced in the return stroke (FIGURE 4) at high speed because the fluid escapes from the R. H. chamber of cylinder 2 through port 19 and connection 14 with a slight resistance. When, however, in its movement piston 1 will cover port 19 (FIGURE 5), the fluid may come out from the R. H. chamber of the cylinder only through pipe 22 and connection 15 and then through the flow regulator R, which offers a comparatively high resistance suitably chosen so that the speed of piston 1 will be limited, as required. To this stage of movement of piston 1 there will correspond the actual engagement of the clutch member, which must take place slowly. Continuing in its slow stroke, piston 1 will expose port 21 at a given moment, thereby establishing a communication of low resistance between the two chambers of the cylinder along the pipe 22, 20, 21, so that the piston will again be accelerated and covers the last portion of its stroke at high speed (FIGURE 6), finally again reaching the position of rest.

The extent of the various portions of the stroke may be determined by regulating the position of ports 19 and 21, whilst the speed of the various movement stages will depend on the resistance—and therefore on the inner diameter—of the various pipes and the regulator R, as well as on the force of the return member; all these factors may be determined at will.

In some applications, such as the engagement of a clutch, the performance of the device described—already satisfactory per se could be further improved if the reduced displacement speed of the engagement control member, in the middle stage of said engagement, were not a constant and invariable one but would depend on the actual working conditions of the engine when engagement is made; more particularly, it would be advantageous to effect the engagement more slowly during the starting stage of the vehicle and more rapidly upon shifting gears when said vehicle is already in movement. These various stages substantially differ in that at starting the engine is caused to run at a comparatively low speed, whereas on shifting gears during normal running the speed of the engine is considerably higher. Therefore, the objects of the instant invention also comprise a complementary device which may be applied to or embodied in the device described above, so as to modify the sliding speed of piston 1 during its middle stage of movement depending on the speed of revolution of the engine or, where preferred, on another factor suitably chosen, or also with manual control.

This complementary device comprises a body 26 which is bored at the inside so as to form a little cylinder wherein can freely slide a plunger 27 in which a helical spring 28 is seated; this spring abuts against a threaded plug 29 screwed in a metal ring 30 which closes the one end of the little cylinder, while the opposite end of the latter is closed by a pipe connection 31 integral with a pipe 32 and extending into the inside of said litle cylinder with a flange 33 which limits the stroke of plunger 27 and is provided with holes in its side walls; the plunger 27 is urged by the spring 28 against flange 33, in an inoperative position, and the load of said spring may be adjusted by means of the threaded plug 29.

Figure 7:
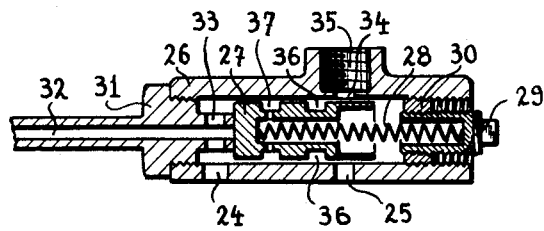
FIG. 7 shows, separately, a complementary device which can be added to the object of the invention in order to improve the performance thereof, and FIG. 8 repeats the diagram of FIG. 5, completed with the device shown in FIG. 7.

The walls of the body 26 are provided with two ports 24 and 25, the first of which is adjacent to pipe connection 31 and is permanently in communication with the pipe 32 through the holes in flange 33, whilst the second of said ports is obstructed by plunger 27 in the inoperative position of FIG. 7. In another point of the wall of body 26, and in the same diametral plane of port 25, another opening 34 is provided, which communicates with a pipe connection 35. The outer surface of plunger 27 is formed with an annular groove 36, in a position such as to register with ports 25 and 34 and to connect them together when plunger 27, overcoming the force of spring 28, is displaced to the right until it will abut against the metal ring 30. A further annular groove 37, provided in the outer surface of plunger 27 and communicating with the inner recess of the latter which contains the spring 28, permits passage of the fluid between plunger 27 and the cylinder during the movement of said plunger.

The body 26 of this complementary device is intended to be mounted on the casing 3 and the head 5 of the device described above, with port 24 communicating with connection 14 of head 5 and with port 25 in register with connection 15 of casing 3. On the connection 13 of head 4 there is fastened the pipe 23 leading to the arrival of the pressure fluid from the circulating pump, whilst the lines leading to pipe connections 31 and 35 are connected with the fluid reservoir for intake of said circulating pump.

The face of plunger 27, opposite to flange 33, is acted upon by a fluid pressure which corresponds to the pressure drop along pipe 32, of comparatively reduced inner diameter as compared to that of pipe 14, and is a function of the delivery of said circulating pump and therefore generally of the speed of the engine by which the pump is driven. The load of spring 28 is adjusted in such a manner that, when the engine is running at low speed, said pressure will be overcome by said spring, which maintains plunger 27 in its inoperative position, as shown in FIG. 7. In this position, communication between connection 15 and pipe connection 35 is established only by the restricted passage (clearance) between the outer surface of plunger 27 and the little cylinder bored in body 26, and therefore it will offer a considerable resistance thereby causing a considerable slowing down of the movement of piston 1 during the middle stage of its displacement of engagement. The clearance between plunger 27 and the little cylinder is therefore chosen, or integrated with connecting grooves of small cross section, so that the engagement speed in these conditions will be suited for starting of the vehicle.

Figure 8:
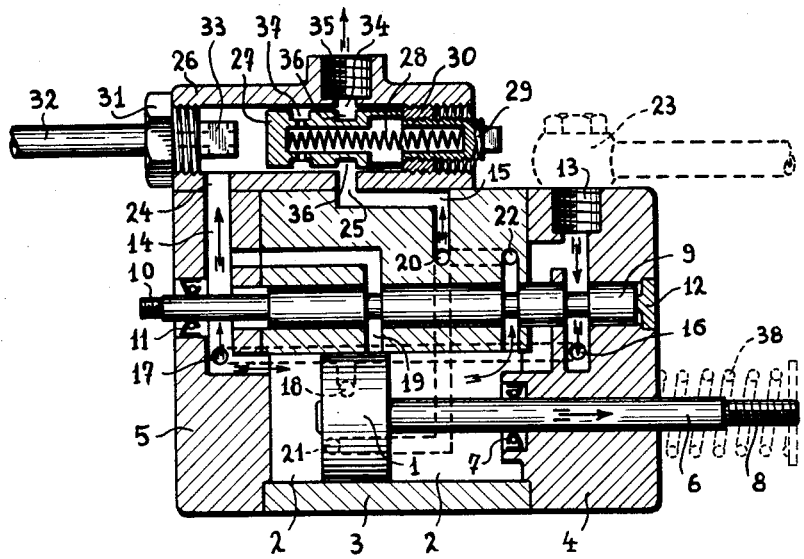

When, instead, the speed of the engine is somewhat higher, as for instance during gear shifting, the pressure acting upon the face of plunger 27 opposite to flange 33 is in excess of the adjustment of spring 28, whereby said plunger 27 will be displaced in the operative position as shown in FIG. 8. Communication between connection 15 and pipe connection 35 is then established by the annular groove 36 of comparatively large cross section and therefore offering a reduced resistance; it follows that, in these conditions, engagement will take place more rapidly. The cross section of groove 36 will be chosen, in turn, so that this engagement speed will be adequate.

In the shown embodiment and with the connections described, the auxiliary device is suited to regulate or adjust the engagement speed of the main device in a manner automatically dependent on the speed of the engine. It is apparent, however, that the same device—merely if differently connected—could receive on the face of plunger 27, opposite to flange 33, a pressure which can be made dependent on any other factor suitably chosen to control the engagement speed. On the other hand, the pressure could also be applied on said face of the plunger through a hand control in case it is preferred to control manually, instead of automatically, the variation of engagement speed.

It is apparent that the constructional arrangements of the device according to the invention may vary within wide limits without departing from the scope of the appended claims. For instance, the slide valve may be arranged in a manner different from that shown in the drawings, relative to the cylinder; or use may be made of a rotary distributing valve instead of a slide valve.

The number of ports provided in the walls of the cylinder may vary, as well as the connection thereof, in case that more than three stages of movement with different speeds are desired or, at contrary, only two stages are required. Correspondingly, the arrangement of the connections in said device may vary; further, the connection 15 may even be omitted when the flow regulator member is disposed at the inside of the device itself. This is particularly advantageous in the case when said member consists of a simple diaphragm with gauged hole. The control member of slide valve 9 may be of various types, but preferably it will be electromagnetic and controlled by means of a push-button disposed on the gear shift lever of the vehicle when the device is applied to motor cars, which is considered to be a particularly suitable application. In the auxiliary device, permanent communication between the ports 25 and 34 may be established by means of a groove annular or of different shape, formed in the body 26 of the device, whilst the annular groove 36 in plunger 27 may be replaced with a helical or differently shaped groove in order to attain a more gradual variation of the hydraulic resistance offered to the flow between ports 25 and 34.

Having thus described my invention, what I claim is:

1. A pressure fluid actuated servo-control device, comprising a cylinder, a piston reciprocable within said cylinder, and defining in said cylinder a first chamber and a second chamber separated from said first chamber, a connection for arrival of a pressure fluid flow actuating said reciprocable piston, a pipe connecting said arrival connection with said first chamber of the cylinder, a connection for discharge of the pressure fluid, a pipe connecting said discharge connection with said second chamber of the cylinder, ports bored in the wall of said cylinder, pipes connecting said ports with said discharge connection, means inserted in one of said pipes for restraining the fluid flow therein, and a slide valve inserted in said pipes, whereby said slide valve controls the fluid flow actuating the forward and rearward movements of said piston reciprocable in said cylinder, whilst the rearward movement of said piston takes place with a different speed according to the position of the piston with respect to said ports bored in the wall of the cylinder.

2. A pressure fluid actuated servo-control device, comprising a cylinder, a piston reciprocable within said cylinder, and defining in said cylinder a first chamber having an end wall and second chamber separated from said first chamber, a connection for arrival of pressure fluid flow, a pipe connecting said arrival connection with said first chamber of the cylinder, a connection for discharge of the pressure fluid, a pipe connecting said discharge connection with said second chamber of the cylinder, a first port bored in the wall of said cylinder in proximity of the end wall of said first chamber, means for restraining the fluid flow, a pipe connecting said first port with said discharge connection through said means for restraining the fluid flow, a second port bored in the middle portion of the wall of said cylinder, a pipe connecting said second port with said discharge connection, and a slide valve inserted in said pipes for controlling the fluid flow actuating the forward and rearward movements of said piston reciprocable in said cylinder, whereby the rearward movement of said piston takes place with a high speed as long as said second port is not covered by said piston, and proceeds with a lower speed after said second port has been covered by the piston.

3. A pressure fluid actuated servo-control device, comprising a cylinder, a piston reciprocable within said cylinder, and defining in said cylinder a first chamber having an end wall and a second chamber separated from said first chamber, a connection for arrival of a pressure fluid flow, a pipe connecting said arrival connection with said first chamber of the cylinder, a connection for discharge of the pressure fluid, a pipe connecting said discharge connection with said second chamber of the cylinder, a first port bored in the wall of said cylinder in proximity of the end wall of said first chamber, means for restraining the fluid flow, a pipe connecting said first port with said discharge connection through said means for restraining the fluid flow, a second port bored in the middle portion of the wall of said cylinder, a pipe directly connecting said first port with said second port, and a slide valve inserted in said pipes for controlling the fluid flow actuating the forward and rearward movements of said piston reciprocable in said cylinder, whereby the rearward movement of said piston takes place with a reduced speed as long as said second port is covered by said piston, and proceeds with a higher speed after said second port has ceased to be covered by the piston.

4. A pressure fluid actuated servo-control device, comprising a cylinder, a piston reciprocable within said cylinder, and defining in said cylinder a first chamber having an end wall and a second chamber separated from said first chamber, a connection for arrival of a pressure fluid flow, a pipe connecting said arrival connection with said first chamber of the cylinder, a connection for discharge of the pressure fluid, a pipe connecting said discharge connection with said second chamber of the cylinder, a first port bored in the wall of said cylinder in proximity of the end wall of said first chamber, means for restraining the fluid flow, a pipe connecting said first port with said discharge connection through said means for restraining the fluid flow, a second port bored in the middle portion of the wall of said cylinder, a pipe connecting said second port with said discharge connection, a third port bored in the middle portion of the wall of said cylinder, a pipe directly connecting said first port with said third port, and a slide valve inserted in said pipes for controlling the fluid flow actuating the forward and rearward movements of said piston reciprocable in said cylinder, whereby the rearward stroke of said piston takes place with a high speed in a first portion of the stroke, as long as said second port is not covered by said piston, proceeds with a lower speed in a second portion of the stroke, after said second port has been covered by the piston while said third port is also covered by the piston, and proceeds further with a high speed in the last portion of the stroke, after said third port has ceased to be covered by the piston.

5. A pressure fluid actuated servo-control device as set forth in claim 1, wherein said means for restraining the fluid flow comprises a little cylinder, a plunger reciprocable within said little cylinder and defining in said little cylinder a first little chamber and a second little chamber separated from said first little chamber, said second little chamber being in communication with said discharge connection, a spring abutting against said plunger for forcing it into said second little chamber, a discharge pipe departing from said second little chamber, a discharge port bored in the wall of said first little chamber, a pipe connecting said first little chamber with the ports bored in the wall of the cylinder of the servo-control device, and a groove provided on the surface of said plunger and connecting with lower resistance said discharge port with the outlet of said pipe in the first little chamber, when said plunger is within the first little chamber, whilst said discharge port and said outlet are connected with a higher resistance when said plunger is within the second little chamber, whereby when the fluid pressure in said second little chamber exerts on the plunger a lower force than said spring, said plunger is forced into said second chamber and the discharge of the pressure fluid takes place with a high resistance, whilst said discharge takes place with a lower resistance when, said pressure overcoming the force of the spring, said plunger is forced into said first little chamber.

6. A pressure fluid actuated servo-control device as set forth in claim 1, wherein said means for restraining the fluid flow comprises a little cylinder, a plunger reciprocable within said little cylinder and defining in said little cylinder a first little chamber and a second little chamber separated from said first little chamber, said second little chamber being in communication with said discharge connection, a spring abutting against said plunger within said first little chamber, a screw-threaded plug constituting the end wall of said first little chamber, said spring abutting against said plug, a discharge pipe departing from said second little chamber, a discharge port bored in the wall of said first little chamber, a pipe connecting said first little chamber with the ports bored in the wall of the cylinder of the servo-control device, and a groove provided on the surface of said plunger and connecting said discharge port with the outlet of said pipe when the plunger is within said first chamber, whereby said spring urges said plunger into said second chamber with a force which may be adjusted by screwing or unscrewing said screw-threaded plug.

References Cited in the file of this patent
UNITED STATES PATENTS

| | | |
|---|---|---|
| 530,341 | Hill | Dec. 4, 1894 |
| 840,877 | Steedman | Jan. 8, 1907 |
| 2,164,865 | Keiper | July 4, 1939 |
| 2,225,315 | McCollum | Dec. 17, 1940 |